(12) United States Patent
Li et al.

(10) Patent No.: US 11,524,866 B2
(45) Date of Patent: Dec. 13, 2022

(54) TESTING FOR WIRELESS BEACONS OF ELEVATOR SYSTEM AND FIELD INSTALLATION OF THE ELEVATOR SYSTEM

(71) Applicant: Otis Elevator Company, Farmington, CT (US)

(72) Inventors: Kai Li, Shanghai (CN); Yang Yang, Shanghai (CN); Siqi Ma, Shanghai (CN); Yu Zhang, Shanghai (CN); Haofeng Hou, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1020 days.

(21) Appl. No.: 16/235,281

(22) Filed: Dec. 28, 2018

(65) Prior Publication Data

US 2019/0202657 A1 Jul. 4, 2019

(30) Foreign Application Priority Data

Dec. 28, 2017 (CN) .......................... 201711455525.4

(51) Int. Cl.
*B66B 1/34* (2006.01)
*B66B 5/00* (2006.01)
(Continued)

(52) U.S. Cl.
CPC .......... *B66B 1/3461* (2013.01); *B66B 5/0087* (2013.01); *G06F 1/1698* (2013.01); *G06F 21/35* (2013.01)

(58) Field of Classification Search
CPC ... B66B 1/3461; B66B 5/0087; G06F 1/1698; G06F 21/35
(Continued)

(56) References Cited

U.S. PATENT DOCUMENTS 5,027,299 A * 6/1991 Uetani ................. B66B 5/0037
702/122
7,172,055 B2 2/2007 Engel et al.
(Continued)

FOREIGN PATENT DOCUMENTS

CN 1911771 B 5/2010
CN 104609270 A 5/2015
(Continued)

OTHER PUBLICATIONS

European Search Report for application EP 18214775.1, dated May 28, 2019, 28 pages.
(Continued)

*Primary Examiner* — Kerri L McNally
(74) *Attorney, Agent, or Firm* — Cantor Colburn LLP

(57) ABSTRACT

A mobile terminal of the present invention is configured to test a wireless beacon that is mounted in an elevator system and used for establishing a wireless connection with the mobile terminal and receiving service request commands. The wireless beacon is at least coupled to an elevator controller of the elevator system. The mobile terminal is configured to include: a connection testing module configured to test whether the wireless beacon can successfully establish the wireless connection with the mobile terminal and/or configured to test whether the wireless beacon can successfully establish a communication connection with the elevator controller; and a service request testing module configured to send a service request test command to the wireless beacon to enable the wireless beacon to automatically complete a service request test on the wireless beacon.

21 Claims, 6 Drawing Sheets

(51) Int. Cl.
*G06F 1/16* (2006.01)
*G06F 21/35* (2013.01)

(58) Field of Classification Search
USPC .......................................................... 187/393
See application file for complete search history.

(56) References Cited

U.S. PATENT DOCUMENTS

| | | | | |
|---|---|---|---|---|
| 8,485,317 | B2* | 7/2013 | Gerstenkorn | B66B 1/468 |
| | | | | 187/247 |
| 9,173,172 | B2 | 10/2015 | Shinada et al. | |
| 9,582,657 | B2 | 2/2017 | Staengler et al. | |
| 2006/0108181 | A1* | 5/2006 | Bacellar | B66B 1/34 |
| | | | | 187/247 |
| 2009/0295550 | A1* | 12/2009 | Oh | B66B 1/462 |
| | | | | 340/286.06 |
| 2011/0071682 | A1* | 3/2011 | Reynolds | B66B 13/143 |
| | | | | 700/298 |
| 2015/0284214 | A1* | 10/2015 | Park | B66B 5/0025 |
| | | | | 187/393 |
| 2016/0221791 | A1* | 8/2016 | Berryhill | B66B 1/2458 |
| 2016/0229665 | A1* | 8/2016 | Colombano | B66B 1/3423 |
| 2016/0311646 | A1* | 10/2016 | Bryant | B66B 1/468 |
| 2017/0137255 | A1* | 5/2017 | Simcik | B32B 27/08 |
| 2017/0291800 | A1* | 10/2017 | Scoville | B66B 19/00 |
| 2019/0161316 | A1* | 5/2019 | Nichols | B66B 1/2408 |

FOREIGN PATENT DOCUMENTS

| | | |
|---|---|---|
| CN | 204778091 U | 11/2015 |
| CN | 105293238 A | 2/2016 |
| CN | 206336869 U | 7/2017 |
| CN | 206336872 U | 7/2017 |
| CN | 206447425 U | 8/2017 |
| DE | 202013100440 U1 | 2/2013 |
| EP | 3030509 B1 | 6/2016 |
| EP | 3124418 A1 | 8/2017 |
| WO | 2016174486 A1 | 11/2016 |

OTHER PUBLICATIONS

Indian Office Action for Application No. 201814047205; dated Mar. 2, 2021; 6 Pages.

* cited by examiner

TESTING FOR WIRELESS BEACONS OF ELEVATOR SYSTEM AND FIELD INSTALLATION OF THE ELEVATOR SYSTEM

FOREIGN PRIORITY

This application claims priority to Chinese Patent Application No. 201711455525.4, filed Dec. 28, 2017, and all the benefits accruing therefrom under 35 U.S.C. § 119, the contents of which in its entirety are herein incorporated by reference.

TECHNICAL FIELD

The present invention belongs to the field of elevator system technologies and relates to a test on a wireless beacon of an elevator system and field configuration of an elevator system, and in particular, to a mobile terminal, a method of testing a wireless beacon mounted in an elevator system, a field configuration apparatus of an elevator system and a field configuration method of an elevator system.

BACKGROUND ART

During the installation, testing, or maintenance of an elevator system, for example, before the elevator system runs normally, certain components of the elevator system need to be tested or field-configured to ensure that all components can implement corresponding functions normally. At present, these jobs all require the staff to manually complete a series of operations. The staff need to meet high operational requirements; the process is complex and involves a heavy workload.

Especially after a new component to be tested or field-configured is introduced into the elevator system, for example, wireless beacons mounted in the elevator system to realize automatic elevator call, the manual workload of testing or field configuration of the wireless beacons is further increased due to the large number of the wireless beacons in the elevator system.

SUMMARY OF THE INVENTION

According to a first aspect of the present invention, a mobile terminal is provided for testing a wireless beacon that is mounted in an elevator system and used for establishing a wireless connection with the mobile terminal and receiving service request commands, the wireless beacon being at least coupled to an elevator controller of the elevator system; the mobile terminal is configured to include: a connection testing module configured to test whether the wireless beacon can successfully establish the wireless connection with the mobile terminal and/or configured to test whether the wireless beacon can successfully establish a communication connection with the elevator controller; and a service request testing module configured to send a service request test command to the wireless beacon to enable the wireless beacon to automatically complete a service request test on the wireless beacon.

In the mobile terminal according to an embodiment of the present invention, the wireless beacon includes: a first wireless beacon mounted in an elevator car of the elevator system, configured to broadcast a first wireless signal and receive a service request test command regarding a destination floor; and a second wireless beacon mounted in an elevator landing zone of the elevator system, configured to broadcast a second wireless signal and receive a service request test command regarding an elevator call direction.

In the mobile terminal according to an embodiment of the present invention, the connection testing module is further configured to test whether the first wireless beacon can successfully establish a first wireless connection with the mobile terminal and test whether the first wireless beacon can successfully establish a first communication connection with the elevator controller.

In the mobile terminal according to an embodiment of the present invention, the service request testing module is further configured to send to the first wireless beacon a service request test command regarding a destination floor to enable the first wireless beacon to automatically complete a registration request test for all destination floors to be tested.

In the mobile terminal according to an embodiment of the present invention, the connection testing module is further configured to test whether the second wireless beacon can successfully establish a second wireless connection with the mobile terminal and test whether the second wireless beacon can successfully establish a second communication connection with the elevator controller.

In the mobile terminal according to an embodiment of the present invention, the service request testing module is further configured to send to the second wireless beacon a service request test command regarding an elevator call direction to enable the second wireless beacon to automatically complete an elevator call request test for all elevator call directions.

In the mobile terminal according to an embodiment of the present invention, all the destination floors to be tested include floors where all the second wireless beacons to be tested are located.

In the mobile terminal according to an embodiment of the present invention, the connection testing module is further configured to, when the elevator car stops on a corresponding destination floor and the car door opens, automatically test whether the second wireless beacon of the destination floor can successfully establish a second wireless connection with the mobile terminal and test whether the second wireless beacon of the destination floor can successfully establish a second communication connection with the elevator controller; and the service request testing module is further configured to send to the second wireless beacon of the destination floor a service request test command regarding all the elevator call directions to enable the second wireless beacon of the destination floor to automatically complete the elevator call request test for all the elevator call directions.

The mobile terminal according to an embodiment of the present invention further includes: a recording module configured to at least record a service request test result returned from the wireless beacon.

The mobile terminal according to an embodiment of the present invention further includes: a recording module configured to at least record a registration request test result returned from the first wireless beacon and including a registration failure of a corresponding destination floor, and/or further configured to at least record an elevator call request test result returned from the second wireless beacon and including an elevator call request failure regarding a particular elevator call direction on a corresponding floor.

The mobile terminal according to an embodiment of the present invention further includes a wireless signal testing module configured to test signal strength of the wireless signal sensed at a corresponding position point relative to the wireless beacon.

The mobile terminal according to an embodiment of the present invention further includes a recording module configured to record the signal strength tested by the wireless signal testing module.

The mobile terminal according to an embodiment of the present invention further includes: a field configuration module configured to enable the mobile terminal to establish a wireless connection with the wireless beacon and input configuration parameters to configure the wireless beacon or a corresponding component in the elevator system that is communicatively connected with the wireless beacon.

In the mobile terminal according to an embodiment of the present invention, the component includes an elevator call control panel, a destination floor registration control panel and the elevator controller.

In the mobile terminal according to an embodiment of the present invention, the field configuration module is further configured to adjust signal strength of a wireless signal broadcast by the wireless beacon.

In the mobile terminal according to an embodiment of the present invention, the field configuration module is further configured to acquire current state information of the wireless beacon or the corresponding component in the elevator system that is communicatively connected with the wireless beacon.

The mobile terminal according to an embodiment of the present invention further includes: a user verification module configured to verify the identity of a user who tests the wireless beacon by using the mobile terminal.

In the mobile terminal according to an embodiment of the present invention, the wireless beacon is a Bluetooth module or Bluetooth Low Energy module, and the wireless signal is a Bluetooth signal or Bluetooth Low Energy signal.

According to a second aspect of the present invention, a method of testing a wireless beacon mounted in an elevator system is provided, wherein the wireless beacon is used for establishing a wireless connection with a mobile terminal and receiving service request commands, and the wireless beacon is at least coupled to an elevator controller of the elevator system; the method includes the following steps: a connection testing step of testing whether the wireless beacon can successfully establish the wireless connection with the mobile terminal and/or testing whether the wireless beacon can successfully establish a communication connection with the elevator controller; and a service request testing step of, when it is tested that the wireless connection and the communication connection have been successfully established, sending a service request test command to the wireless beacon to enable the wireless beacon to automatically complete a service request test on the wireless beacon.

In the method according to an embodiment of the present invention, the wireless beacon includes: a first wireless beacon mounted in an elevator car of the elevator system, configured to broadcast a first wireless signal and receive a service request test command regarding a destination floor; and a second wireless beacon mounted in an elevator landing zone of the elevator system, configured to broadcast a second wireless signal and receive a service request test command regarding an elevator call direction.

In the method according to an embodiment of the present invention, in the connection testing step, it is tested whether the first wireless beacon can successfully establish a first wireless connection with the mobile terminal and it is tested whether the first wireless beacon can successfully establish a first communication connection with the elevator controller.

In the method according to an embodiment of the present invention, in the service request testing step, a service request test command regarding a destination floor is sent to the first wireless beacon to enable the first wireless beacon to automatically complete a registration request test for all destination floors to be tested.

In the method according to an embodiment of the present invention, in the connection testing step, it is tested whether the second wireless beacon can successfully establish a second wireless connection with the mobile terminal and it is tested whether the second wireless beacon can successfully establish a second communication connection with the elevator controller.

In the method according to an embodiment of the present invention, in the service request testing step, a service request test command regarding an elevator call direction is sent to the second wireless beacon to enable the second wireless beacon to automatically complete an elevator call request test for all elevator call directions.

In the method according to an embodiment of the present invention, all the destination floors to be tested include floors where all the second wireless beacons to be tested are located.

In the method according to an embodiment of the present invention, in the connection testing step, when the elevator car stops on a corresponding destination floor and the car door opens, it is automatically tested whether the second wireless beacon of the destination floor can successfully establish a second wireless connection with the mobile terminal and it is tested whether the second wireless beacon of the destination floor can successfully establish a second communication connection with the elevator controller; and in the service request testing step, a service request test command regarding all the elevator call directions is sent to the second wireless beacon of the destination floor to enable the second wireless beacon of the destination floor to automatically complete the elevator call request test for all the elevator call directions.

The method according to an embodiment of the present invention further includes: a recording step of recording a service request test result returned from the wireless beacon.

The method according to an embodiment of the present invention further includes: a recording step of at least recording a registration request test result returned from the first wireless beacon and including a registration failure of a corresponding destination floor, and/or at least recording an elevator call request test result returned from the second wireless beacon and including an elevator call request failure regarding a particular elevator call direction on a corresponding floor.

The method according to an embodiment of the present invention further includes a wireless signal testing step of testing signal strength of the wireless signal sensed at a corresponding position point relative to the wireless beacon.

The method according to an embodiment of the present invention further includes: a recording step of recording the signal strength tested in the wireless signal testing step.

The method according to an embodiment of the present invention further includes a field configuration step of enabling the mobile terminal to establish a wireless connection with the wireless beacon, and inputting configuration parameters to configure the wireless beacon or a corresponding component in the elevator system that is communicatively connected with the wireless beacon.

In the method according to an embodiment of the present invention, the component includes an elevator call control panel, a destination floor registration control panel and the elevator controller.

In the method according to an embodiment of the present invention, in the field configuration step, signal strength of a wireless signal broadcast by the wireless beacon is further adjusted.

In the method according to an embodiment of the present invention, in the field configuration step, current state information of the wireless beacon or the corresponding component in the elevator system that is communicatively connected with the wireless beacon is further acquired.

The method according to an embodiment of the present invention further includes: a user verification step of verifying the identity of a user who tests the wireless beacon by using the mobile terminal.

In the method according to an embodiment of the present invention, the wireless beacon is a Bluetooth module or Bluetooth Low Energy module, and the wireless signal is a Bluetooth signal or Bluetooth Low Energy signal.

According to a third aspect of the present invention, a mobile terminal is provided, including a memory, a processor and a computer program that is stored in the memory and can run on the processor, wherein the steps of any of the methods described above are implemented when the processor executes the program.

According to a fourth aspect of the present invention, a computer readable storage medium with a computer program stored thereon is provided, wherein the program is executed by a processor to implement the steps of any of the methods described above.

According to a fifth aspect of the present invention, a field configuration apparatus of an elevator system is provided, including: a wireless beacon capable of establishing a communication connection with a corresponding configurable component in the elevator system; and a mobile terminal configured to enable the mobile terminal to establish a third wireless connection with the wireless beacon and input configuration parameters to configure the wireless beacon or a corresponding component in the elevator system that is communicatively connected with the wireless beacon, wherein the wireless beacon is mounted in an elevator landing zone and/or an elevator car of the elevator system and broadcasts a corresponding wireless signal around, and the wireless beacon can further receive an elevator call request command from a personal mobile terminal that establishes a fourth wireless connection with the wireless beacon.

In the field configuration apparatus according to an embodiment of the present invention, the mobile terminal is further provided with a user verification module configured to verify the identity of a user who tests the wireless beacon by using the mobile terminal.

In the field configuration apparatus according to an embodiment of the present invention, the wireless beacon is further provided with a communication authorization module configured to determine whether to authorize establishment of the third wireless connection with the mobile terminal.

In the field configuration apparatus according to an embodiment of the present invention, the user verification module is configured to verify the identity based on a user name and a password input by the user.

In the field configuration apparatus according to an embodiment of the present invention, the component includes an elevator call control panel, a destination floor registration control panel and an elevator controller.

In the field configuration apparatus according to an embodiment of the present invention, the mobile terminal is further configured to adjust signal strength of the wireless signal broadcast by the wireless beacon.

In the field configuration apparatus according to an embodiment of the present invention, the mobile terminal is further configured to acquire current state information of the wireless beacon or the corresponding component in the elevator system that is communicatively connected with the wireless beacon.

In the field configuration apparatus according to an embodiment of the present invention, the wireless beacon is a Bluetooth module or Bluetooth Low Energy module, and the wireless signal is a Bluetooth signal or Bluetooth Low Energy signal.

According to a sixth aspect of the present invention, a field configuration method of an elevator system is provided, wherein the elevator system includes a wireless beacon that is mounted in an elevator landing zone and/or an elevator car of the elevator system and broadcasts a corresponding wireless signal around, and the wireless beacon is capable of establishing a communication connection with a corresponding configurable component in the elevator system and capable of receiving an elevator call request command from a personal mobile terminal that establishes a fourth wireless connection with the wireless beacon; the field configuration method includes the following steps: the mobile terminal establishing a third wireless connection with the wireless beacon; and inputting configuration parameters to configure the wireless beacon or a corresponding component in the elevator system that is communicatively connected with the wireless beacon.

The field configuration method according to an embodiment of the present invention further includes a user verification step in which a user verification module verifies the identity of a user who tests the wireless beacon by using the mobile terminal.

The field configuration method according to an embodiment of the present invention further includes a communication authorization step of determining whether to authorize establishment of the third wireless connection with the mobile terminal.

In the field configuration method according to an embodiment of the present invention, in the user verification step, the identity is verified based on a user name and a password input by the user.

In the field configuration method according to an embodiment of the present invention, the component includes an elevator call control panel, a destination floor registration control panel and an elevator controller.

In the field configuration method according to an embodiment of the present invention, in the step of inputting configuration parameters, a corresponding configuration parameter is input to adjust signal strength of the wireless signal broadcast by the wireless beacon.

The field configuration method according to an embodiment of the present invention further includes a step of: acquiring current state information of the wireless beacon or the corresponding component in the elevator system that is communicatively connected with the wireless beacon.

In the field configuration method according to an embodiment of the present invention, the wireless beacon is a Bluetooth module or Bluetooth Low Energy module, and the wireless signal is a Bluetooth signal or Bluetooth Low Energy signal.

The above features and operations of the present invention will become more evident according to the following descriptions and accompanying drawings.

BRIEF DESCRIPTION OF THE DRAWINGS

The above and other objectives and advantages of the present invention will become more complete and clearer from the following detailed descriptions with reference to the accompanying drawings. Identical or similar elements are represented with identical reference signs.

DETAILED DESCRIPTION

The present invention is now described more completely with reference to the accompanying drawings, in which exemplary embodiments of the present invention are shown. However, the present invention can be implemented according to a number of different forms and should not be construed as being limited to the embodiments elaborated here. On the contrary, these embodiments are provided to make the disclosure thorough and complete and to fully convey the idea of the present invention to those skilled in the art.

Some of the block diagrams shown in the accompanying drawings are functional entities that do not necessarily correspond to physically or logically independent entities. These functional entities can be implemented in the form of software, or implemented in one or more hardware modules or integrated circuits, or implemented in different processing devices and/or micro-controller devices.

Figure 8:
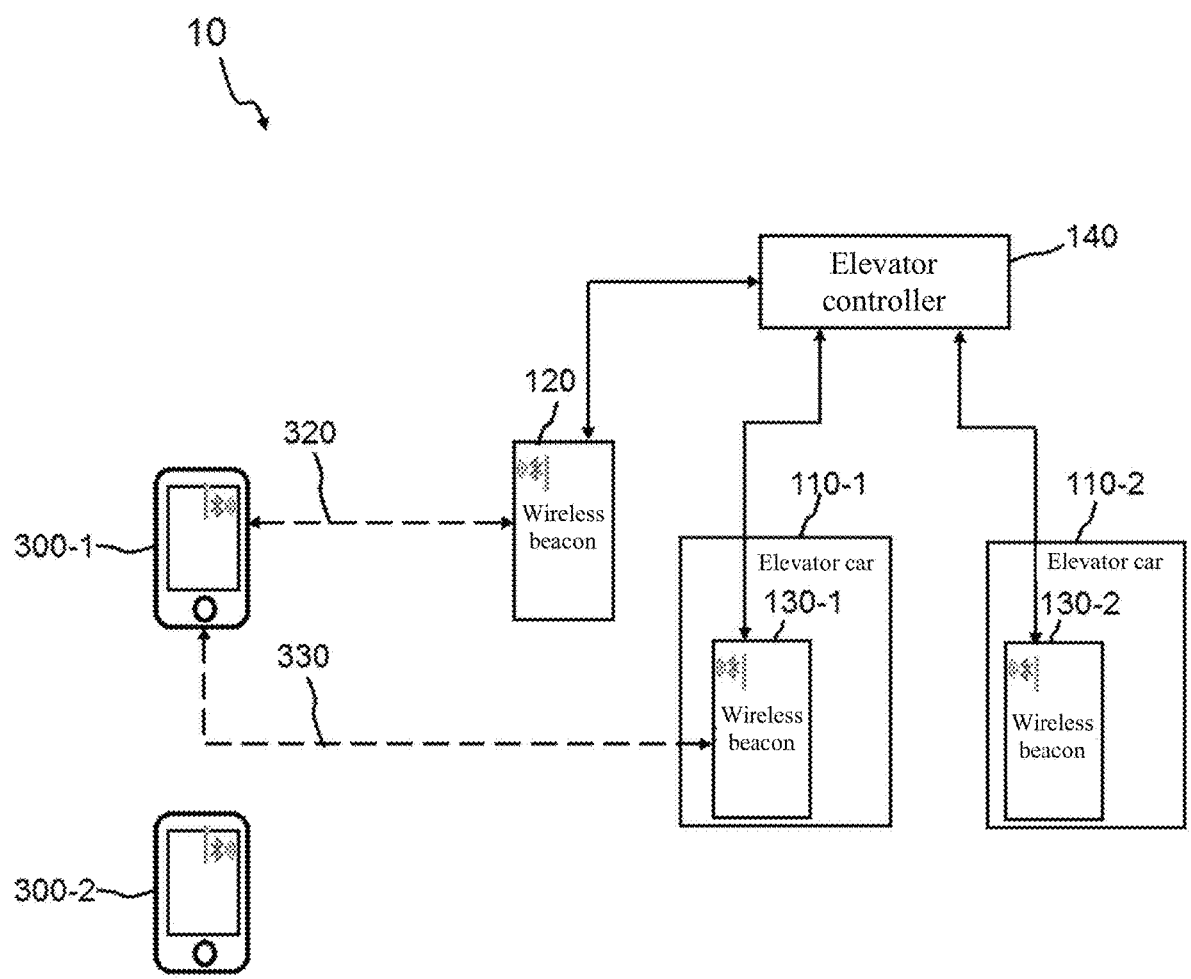
FIG. 8 is a schematic diagram of an elevator system to which the present invention is applied.

FIG. 8 is a schematic diagram of an elevator system to which the present invention is applied. The elevator system 10 according to the embodiment of the present invention is installed in a building. The elevator system 10 includes multiple elevator cars 110 that move up and down in hoistways of the building, for example, elevator cars 110-1 and 110-2. Movement or stop of each elevator car 110 in the hoistway, that is, each elevator car 110, is under the control of an elevator controller 140 in the elevator system 10. Generally, the elevator controller 140 needs to acquire service request commands regarding elevator call directions and service request commands regarding destination floors from various elevator landing zones (or referred to as elevator lobbies) 410, thus controlling operation of the elevator based on the commands, for example, controlling scheduling of the elevator cars 110.

Figure 3:
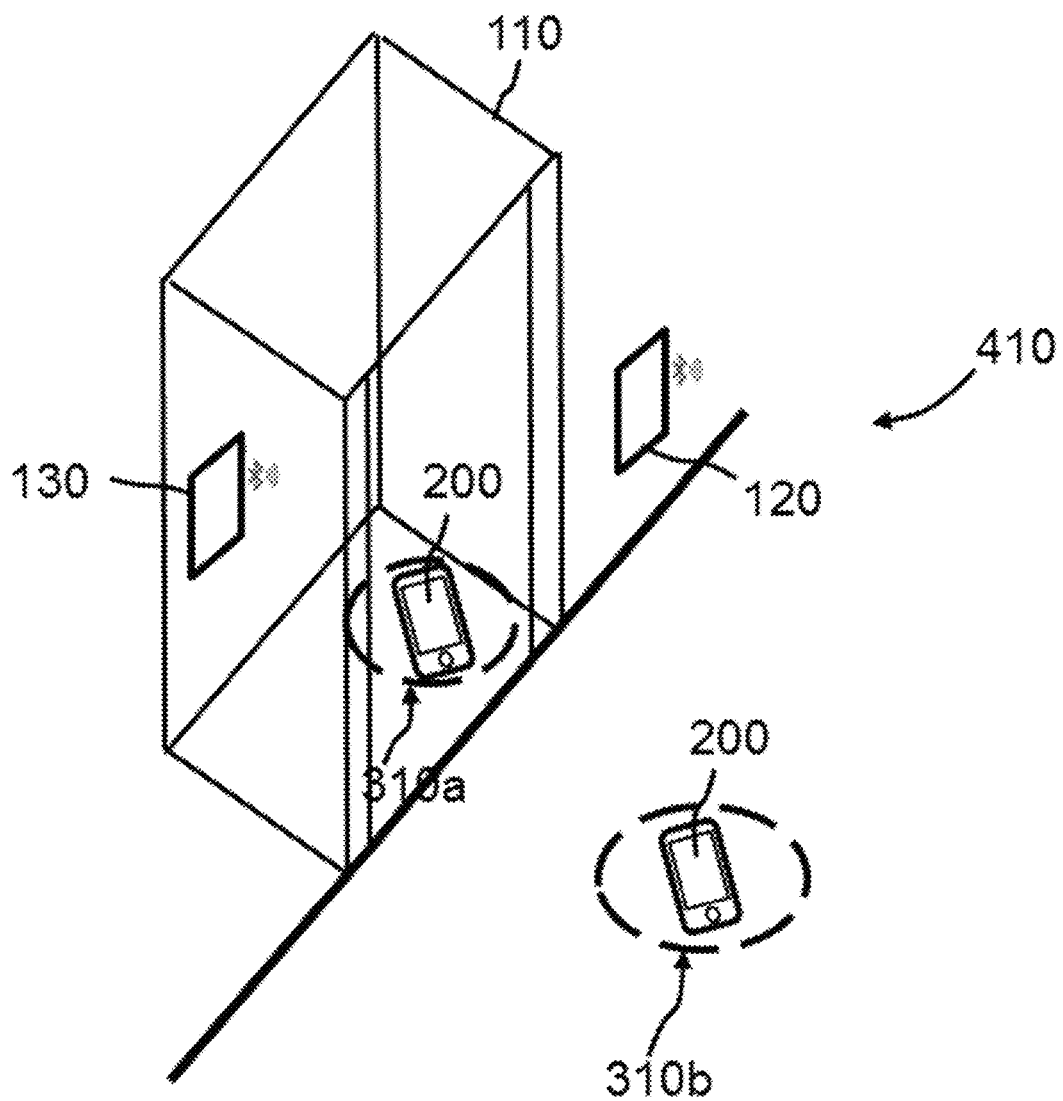
FIG. 3 is a schematic diagram of another application scenario in which a mobile terminal according to an embodiment of the present invention is used to test a wireless beacon.

In the elevator system 10 of the embodiment as shown in FIG. 8, the service request commands regarding elevator call directions and the service request commands regarding destination floors are from wireless beacons 120 and wireless beacons 130, respectively. The elevator system 10 is provided with the wireless beacons 120. The wireless beacons 120 can be mounted in the elevator landing zones 410 of the elevator system 10 (as shown in FIG. 3). For example, a wireless beacon 120-1 is mounted in the elevator landing zone 410-1 of the Floor 1, a wireless beacon 120-2 is mounted in the elevator landing zone 410-2 of the Floor 2, and a wireless beacon 120-$n$ is mounted in the elevator landing zone 410-$n$ of Floor n. It should be understood that each elevator landing zone 410 can be provided with one or more wireless beacons 120, so that wireless signals broadcast by the wireless beacons 120 can effectively substantially cover each elevator landing zone 410. It should be appreciated that the wireless signals broadcast by the wireless beacon 120 can effectively substantially cover the interior of the elevator car 110 when the car door of the elevator car 110 is opened.

The wireless beacon 120 can specifically be a Bluetooth module, for example, a Bluetooth Low Energy (BLE) module. Bluetooth signals broadcast by the wireless beacon 120 all the time or constantly can effectively substantially cover the elevator landing zone 410 where the wireless beacon 120 is located. The Bluetooth signals can be, for example, BLE signals correspondingly.

When a passenger carrying a personal mobile terminal 300 walks toward the wireless beacon 120 of the elevator landing zone 410, the personal mobile terminal 300 can automatically sense a corresponding wireless signal, and for example, when signal strength of the sensed wireless signal is greater than or equal to an elevator call trigger threshold, the personal mobile terminal 300 automatically establishes a wireless connection 320 with the wireless beacon 120 and generates and sends a service request command regarding an elevator call direction. The service request command can be received by the wireless beacon 120 and then sent to the elevator controller 140.

As shown in FIG. 1 again, each elevator car 110 of the elevator system 10 is further provided with a wireless beacon 130 used to broadcast wireless signals. For example, the elevator car 110-1 is provided with a wireless beacon 130-1, and the elevator car 110-2 is provided with a wireless beacon 130-2.

The wireless beacon 130 can specifically be a Bluetooth module, for example, a BLE module. Wireless signals broadcast or transmitted by the wireless beacon 130 all the time or constantly can substantially effectively cover the area in the elevator car 110 where the wireless beacon 130 is mounted. The wireless signals can be, for example, BLE signals correspondingly.

Each personal mobile terminal 300 (for example, personal mobile terminal 300-1 or 300-2) can determine signal strength of the received wireless signal (broadcast by the wireless beacon 120 or 130). In an embodiment, the personal mobile terminal 300 is provided with a received signal strength indicator (RSSI) to determine the signal strength of the received wireless signal (for example, BLE signal). Generally, the signal strength of the wireless signal attenuates with its propagation distance. Therefore, the personal mobile terminal 300 that receives the wireless signal can roughly determine the distance from the personal mobile terminal 300 to the wireless beacon 120 or the wireless beacon 130 according to the magnitude of the signal strength.

When the passenger carrying the personal mobile terminal 300 enters each elevator car 110, the personal mobile terminal 300 can automatically sense the wireless signal broadcast by the wireless beacon 130, and for example, when the signal strength of the sensed wireless signal is greater than or equal to a registration trigger threshold, the personal mobile terminal 300 automatically establishes a wireless connection 330 with the wireless beacon 130 (for example, 130-1) and generates and sends a service request command regarding a destination floor. The service request command can be received by the wireless beacon 130 and then sent to the elevator controller 140.

The personal mobile terminal 300 can be, for example, various smart terminals having a Bluetooth connection function, and can be carried by the passenger conveniently. For example, the personal mobile terminal 300 can be a smart phone, a wearable smart device (such as a smart bracelet), a personal digital assistant (PAD), etc., and can be installed with a corresponding application program (such as APP) to implement its automatic elevator call function.

In an application scenario of the elevator system 10 in the embodiment shown in FIG. 8, when the wireless beacon 120 broadcasts a corresponding wireless signal, the personal mobile terminal 300 carried by the passenger close to the wireless beacon 120 can receive the wireless signal automatically, and the personal mobile terminal 300 automatically establishes a wireless connection 320 with the corresponding wireless beacon 120 based on the wireless signal. Moreover, when establishing the wireless connection 320, the personal mobile terminal 300 sends a service request command regarding an elevator call direction (for example, an "up" or "down" service request command) Correspondingly, the wireless beacon 120 receives the service request command regarding an elevator call direction sent from the personal mobile terminal 300, and the wireless beacon 120 can further send the service request command to the elevator controller 140, so that the elevator controller 140 controls the operation of the one or more elevator cars 110 in the elevator system 10 based on the service request command. The above process can be automatically implemented without requiring the passenger to operate the personal mobile terminal 300. The implementation process is simple and convenient.

Further, when the elevator car 110 is dispatched and stops on a corresponding landing floor, the passenger enters the elevator car 110. The personal mobile terminal 300 carried by the passenger will automatically sense the wireless signal sent by the wireless beacon 130 mounted on the elevator car 110, so as to establish a handshake connection with the wireless beacon 130 based on the wireless signal, that is, a wireless connection 330 is established. The personal mobile terminal 300 automatically sends a service request command regarding a destination floor, so as to automatically complete a registration operation of the destination floor, which neither requires the passenger to manually press down a floor button mounted on a destination floor registration control panel nor requires the passenger to manually operate the personal mobile terminal 300. The above process can be automatically implemented without requiring the passenger to operate the personal mobile terminal 300. The implementation process is simple and convenient.

Wireless beacons 120 and 130 are introduced into the elevator system 10 illustrated above, and thus it is necessary to perform a functional test on each of the wireless beacons 120 and 130, for example, after the mounting and before use. If the test is performed manually, it will be complex and time-consuming to test each of the wireless beacons 120 and 130, and it involves an enormous workload to test a large number of wireless beacons.

Figure 1:
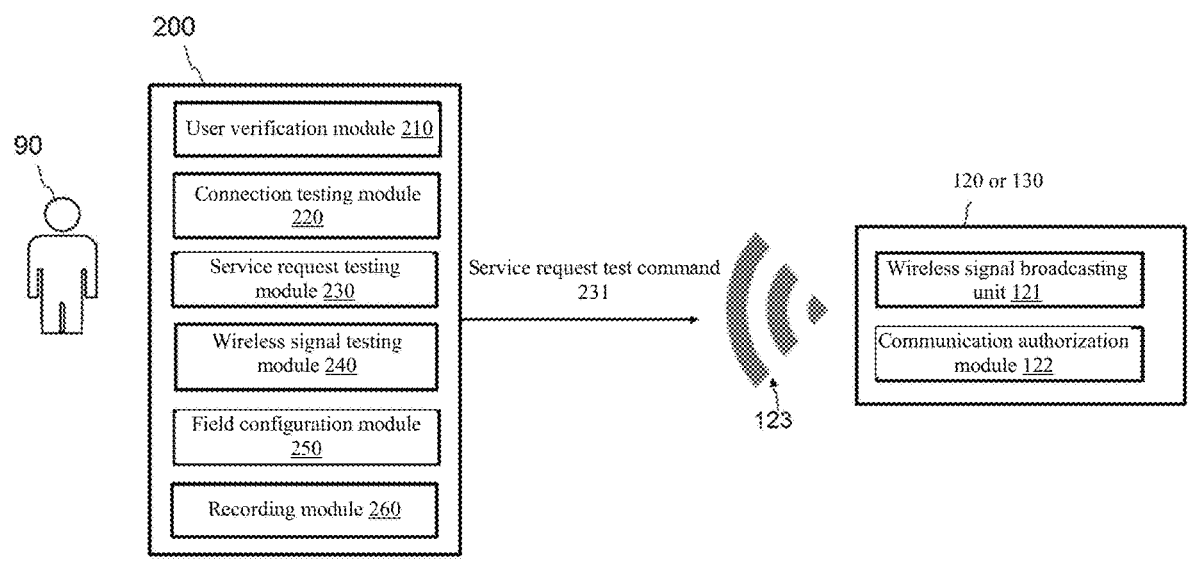
FIG. 1 is a schematic diagram of a modular structure of a mobile terminal according to an embodiment of the present invention.
Figure 2:
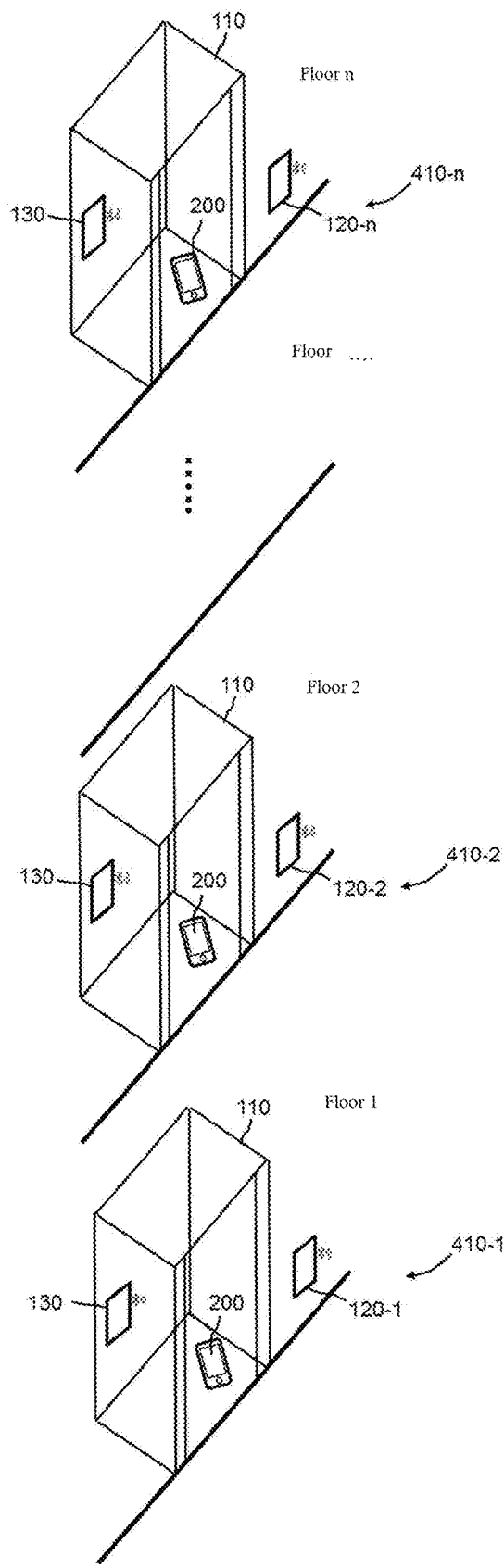
FIG. 2 is a schematic diagram of an application scenario in which a mobile terminal according to an embodiment of the present invention is used to test a wireless beacon.

FIG. 1 is a schematic diagram of a modular structure of a mobile terminal according to an embodiment of the present invention; FIG. 2 is a schematic diagram of an application scenario in which a mobile terminal according to an embodiment of the present invention is used to test a wireless beacon; and FIG. 3 is a schematic diagram of another application scenario in which a mobile terminal according to an embodiment of the present invention is used to test a wireless beacon. The mobile terminal 200 can be used to test a wireless beacon 120 or 130 mounted in the elevator system 10 as shown in FIG. 9. The mobile terminal 200 of the present invention is described below with reference to FIG. 1 to FIG. 3.

As shown in FIG. 1, the mobile terminal 200 can be carried by an operator or user 90 who is authorized to test wireless beacons. The mobile terminal 200 can specifically be, for example, various smart terminals having a Bluetooth connection function, and can be carried by the user 90 conveniently. For example, the mobile terminal 200 can be a smart phone, a personal digital assistant (PAD), and so on, and can be installed with a corresponding application program (such as APP) to implement its automatic test function. The wireless beacon 120 or 130 under test is provided with a wireless signal broadcasting unit 121 that is configured to broadcast a wireless signal 123 of a certain form. The mobile terminal 200 is provided with a corresponding short-range communication unit to sense the wireless signal 123 broadcast by the wireless beacon 120 or 130 and to establish a wireless connection with the wireless beacon 120 or 130 when corresponding conditions are met. If the wireless beacon 120 or 130 is a Bluetooth signal, the short-range communication unit of the mobile terminal 200 can be a Bluetooth communication unit accordingly.

In order to ensure security authorization of the test, on the one hand, a user verification module 210 can be configured in the mobile terminal 200, and the user verification module 210 can verify the identity of a user who uses the mobile terminal 200 to test the wireless beacon. Specifically, the user 90 logs in to a corresponding test APP of the mobile terminal 200 through corresponding pre-allocated user name and password. The user verification module 210 can verify the identity based on the user name and password input by the user 90, so that the security authorization for the user 90 to operate the APP is accomplished on the side of the mobile terminal 200. On the other hand, a communication authorization module 122 is configured on the side of the wireless beacon 122. The communication authorization module 122 determines whether to authorize establishment of a wireless connection with the mobile terminal 200 that attempts to establish the wireless connection. Specifically, the mobile terminal 200 that attempts to establish the wireless connection with the wireless beacon sends a corresponding Token through the test APP. The communication authorization module 122 performs a verification operation (for example, perform decryption and verification or other operations) on the token. If the verification succeeds, the communication authorization module 122 determines to authorize the mobile terminal 200 to establish the wireless connection with the wireless beacon 120 or 130. Otherwise, the mobile terminal 200 is not authorized to establish the connection, and the mobile terminal 200 cannot carry out subsequent tests.

It will be appreciated that the security authorization mechanism is not limited to the above example, and those skilled in the art can implement other authorization mechanisms based on the above teaching.

As shown in FIG. 1 again, the mobile terminal 200 is provided with a recording module 260 configured to record various test results and/or other information, so that the user 90 can conveniently keep track of the test results. The test results can be presented in a variety of easy-to-read ways.

As shown in FIG. 1 again, the mobile terminal 200 is provided with a connection testing module 220. The connection testing module 220 can accomplish connection testing in two aspects. The first aspect is to test whether the wireless beacon 120 or 130 can successfully establish a wireless connection with the mobile terminal 200 (after verification and authorization). The second aspect is to test whether the wireless beacon 120 or 130 can successfully establish a communication connection with the elevator controller 140 of the elevator system 10. The mobile terminal 200 can automatically send a corresponding connection request test command after sensing the wireless signal 123 broadcast by the wireless beacon 120 or 130, thereby testing whether the wireless beacon 120 or 130 can successfully establish a wireless connection with the mobile terminal 200. If the wireless connection is established successfully, the mobile terminal 200 will receive a corresponding response; otherwise, the mobile terminal 200 cannot receive the corresponding response. The recording module 260 will record a test result indicating that the wireless beacon 120 or 130 cannot establish the wireless connection. Further, the wireless beacon 120 or 130 will send a corresponding command to the elevator controller 140. If the wireless beacon 120 or 130 normally establishes a communication connection with the elevator controller 140, the elevator controller 140 will receive a corresponding response returned by the wireless beacon 120 or 130 and then return the corresponding response to the mobile terminal 200; otherwise, the elevator controller 140 cannot receive the corresponding response. The recording module 260 will record a test result indicating that the wireless beacon 120 or 130 cannot establish the communication connection.

As shown in FIG. 1 again, the mobile terminal 200 is provided with a service request testing module 230. The service request testing module 230 is mainly used to automatically test whether each wireless beacon 120 or 130 can normally receive a service request command 231. The service request testing module 230 is configured to send the service request command 231 to the wireless beacon 120 or 130 to enable the wireless beacon 120 or 130 to automatically complete a service request test for the wireless beacon 120 or 130. With respect to the elevator system 10 illustrated in FIG. 8, the service request test includes two methods. The first aspect is a service request test for elevator call directions with respect to the wireless beacon 120. The second aspect is a service request test for destination floors with respect to the wireless beacon 130.

In an embodiment, the service request testing module 230 can be configured to send to the wireless beacon 130 (if the wireless connection with the wireless beacon 130 is established successfully) a service request test command 231a regarding destination floors to enable the wireless beacon 130 to automatically complete a registration request test for all destination floors to be tested. For example, the service request test command 231a regarding destination floors includes registration requests for all the destination floors. If a registration operation on a certain destination floor is not successful, the registration request test conducted by the wireless beacon 130 for the destination floor fails, and the recording module 260 will record information indicating that the registration request test conducted by the wireless beacon 130 for the corresponding destination floor fails.

In an embodiment, the service request testing module 230 can be configured to send to the wireless beacon 120 (if the wireless connection with the wireless beacon 120 is established successfully) a service request test command 231b regarding elevator call directions to enable the wireless beacon 120 to automatically complete a service request test for all elevator call directions. For example, the service request test command 231b regarding elevator call directions includes elevator requests for all the elevator call directions (for example, "up" and "down"). If an elevator call request operation in a certain elevator call direction is not successful, the elevator call request test conducted by the wireless beacon 120 for the elevator call direction fails, and the recording module 260 will record information indicating that the registration request test conducted by the wireless beacon 120 for the corresponding elevator call direction fails.

In an embodiment, all the above destination floors to be tested with respect to the wireless beacon 130 includes floors corresponding to all the wireless beacons 120 to be tested. For example, the destination floors to be tested include all the floors, and the elevator car 110 will stop on all the floors, so as to complete automatic tests for the wireless beacons 120 on all the floors.

As shown in FIG. 1 again, the mobile terminal 200 is provided with a wireless signal testing module 240. The wireless signal testing module 240 is configured to test signal strength of the wireless signal 123 sensed at a corresponding position point relative to the wireless beacon 120 or 130. As shown in FIG. 3, two position points 310a and 310b are shown as an example. 310a denotes a certain position point in the elevator car 110. The wireless signal testing module 240 of the mobile terminal 200 located at the position point 310a not only can test the signal strength of the wireless signal 123 broadcast by the wireless beacon 130, but also can test the signal strength of the wireless signal 123 broadcast by the wireless beacon 120 if it can also sense the wireless signal 123 broadcast by the wireless beacon 120. 310b denotes a certain position point in the elevator landing zone 410. The wireless signal testing module 340 of the mobile terminal 200 located at the position point 310b can test the signal strength of the wireless signal 123 broadcast by the wireless beacon 120. The position point 310b can be set at a position where the signal strength is predetermined to be equal to an elevator call trigger threshold. If the signal strength at the position point 310b is normal, an elevator call request command will be automatically triggered and sent, for example, at the position point 310b when the passenger 90 carries the personal mobile terminal 300. The foregoing signal strength value obtained by testing will be recorded in the recording module 260; for example, the signal strength value can be used for adjusting the signal strength of the wireless signal 123 broadcast by the wireless beacon 120 or 130. It should be understood that the selection of the specific position point is not limited, and the position point can be set according to specific requirements.

As shown in FIG. 1 again, the mobile terminal 200 is provided with a field configuration module 250. The field configuration module 250 can enable the mobile terminal 200 to establish a wireless connection with the wireless beacon 120 or 130. The field configuration module 250 can further input configuration parameters 251 to configure the wireless beacon (120 or 130) or a corresponding component in the elevator system 10 that is communicatively connected with the wireless beacon. The component is configurable, and can be, for example, an elevator call control panel 150, a destination floor registration control panel 160, the elevator controller 140, and so on, and can also be other components listed as an example, such as a display component and a sound playing component in the elevator car 110, a display component in the elevator landing zone, and so on. In an embodiment, the wireless beacon 120 can be integrated with the elevator call control panel 150. The elevator call control panel 150 establishes a connection with the elevator controller 140 through, for example, a bus. Specifically, a Remote Serial Link (RSL) communication connection can be established between the elevator call control panel 150 and the elevator controller 140 or other components of the elevator system 100 based on, for example, but not limited to, an RSL protocol. According to the characteristic that the wireless beacon 120 can establish a communication connection with the configurable components of the elevator system 10 and can conveniently establish, for example, a Bluetooth connection with the mobile terminal 200, the mobile terminal 200 can input configuration parameters 251 to conveniently configure corresponding components. The configuration operation for the corresponding components can be completed in the place where the wireless beacon 120 is provided. In addition, the operation is relatively simple, so that a relatively complex configuration operation can be implemented.

In an example, by taking display color configuration of a display panel of the elevator call control panel 150 as an example, the user 90 carrying the mobile terminal 200 moves to the position of the wireless beacon 120 corresponding to the elevator call control panel 150. The wireless beacon 120 establishes a communication connection with the elevator call control panel 150. The mobile terminal 200 can sense a wireless signal 123 broadcast by the wireless beacon 120 and establish a wireless connection 320. The user 90 inputs a configuration parameter 251, for example, a configuration parameter 251 that represents blue, through a corresponding interface of an APP on the mobile terminal 200. The configuration parameter 251 can be sent to the wireless beacon 120 through the wireless connection and then transmitted to the elevator call control panel 150. The elevator call control panel 150 sets the display color of the display panel to, for example, blue according to the configuration parameter 251.

In an embodiment, the field configuration module 150 is further configured to adjust signal strength of the wireless signal 123 broadcast by the wireless beacon 120. The field configuration module 150 can input a configuration parameter 251 about signal strength based on the signal strength value of the wireless signal 120 broadcast by the wireless beacon 120 tested by the wireless signal testing module 240 at, for example, the position point 310*b* (as shown in FIG. 3). The configuration parameter 251 is sent to the wireless beacon 120 through the wireless connection 320, so as to adjust the signal strength of the wireless beacon 120. As such, the signal strength tested at, for example, the position point 310*b* is basically equal to the elevator call trigger threshold. Thus, the passenger 90 can accurately and automatically trigger an elevator call when carrying the personal mobile terminal 300, thereby improving the experience of the passenger 90.

In an embodiment, the field configuration module 250 is further configured to acquire current state information of the wireless beacon (120 or 130) or the corresponding component in the elevator system 10 that is communicatively connected with the wireless beacon. As such, the state information can be easily obtained. The user 90 can easily keep track of the state information of the wireless beacon and various components, and the maintenance workload of the user 90 can be greatly reduced especially in the maintenance process.

Figure 5:
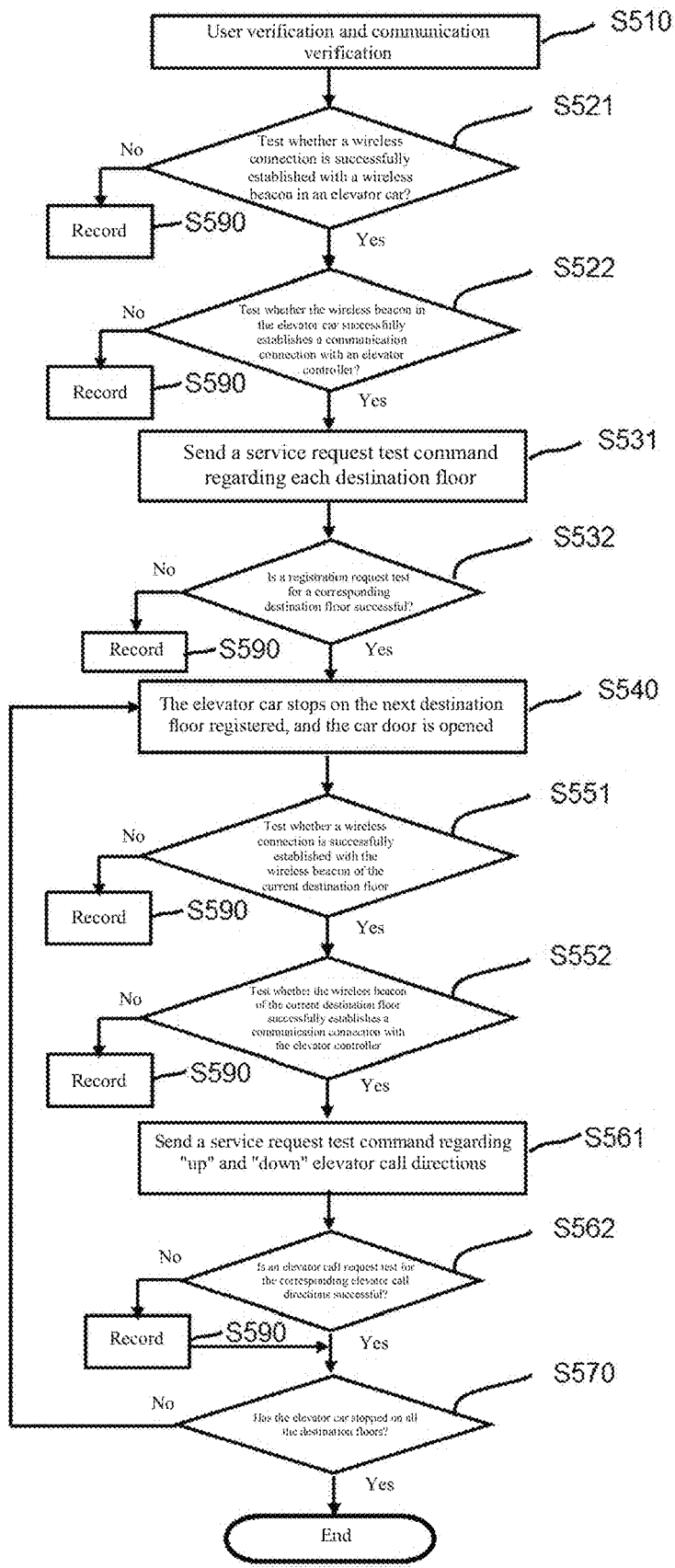
FIG. 5 is a flowchart of a wireless beacon testing method according to an embodiment of the present invention.

FIG. 5 is a flowchart of a wireless beacon testing method according to an embodiment of the present invention. The process of the testing method is illustrated in detail below with reference to FIG. 1, FIG. 2 and FIG. 5, and the working principle of the mobile terminal 200 is illustrated.

As shown in FIG. 2, wireless beacons in the elevator system 10 that need to be tested include the wireless beacon 130 in the elevator car 110 and n wireless beacons 120-1 to 120-*n* of Floor 1 to Floor n.

First of all, in step S510, user verification and communication verification are performed. In this step, the identity of the user 90 who uses the mobile terminal to test the wireless beacon 120 or 130 is verified. Specifically, the user 90 logs in to a corresponding test APP of the mobile terminal 200 through corresponding pre-allocated user name and password, and the identity is verified based on the name and password input by the user 90, so that security authorization for the user 90 to operate the APP is completed on the side of the mobile terminal 200. At the same time, it is determined whether to authorize establishment of a wireless connection with the mobile terminal 200 that attempts to establish the wireless connection. Specifically, the mobile terminal 200 that attempts to establish the wireless connection with the wireless beacon sends a corresponding Token through the test APP. The communication authorization module 122 of the wireless beacon 120 or 130 performs a verification operation (for example, perform decryption and verification or other operations) on the token. If the verification succeeds, the communication authorization module 122 determines to authorize the mobile terminal 200 to establish the wireless connection with the wireless beacon 120 or 130. Otherwise, the mobile terminal 200 is not authorized to establish the connection, and the mobile terminal cannot carry out subsequent tests.

It should be noted that for different wireless beacons, the communication verification process may be required before each test, or the communication verification process may be performed only once. The user verification process can be performed only once for different wireless beacons.

After the verification in step S510 succeeds, the mobile terminal 200 is put into the elevator car 110 as shown in FIG. 2. Step S521 is performed to test whether the wireless beacon 130 in the elevator car 110 can successfully establish a wireless connection 330 with the mobile terminal 200. If the judgment result is "no," a corresponding record is made, that is, step S590 of recording is performed. If the judgment result is "yes," step S522 is performed.

In step S522, it is tested whether the wireless beacon 130 in the elevator car 110 can successfully establish a communication connection with the elevator controller 140. If the judgment result is "no," a corresponding record is made, that is, step S590 of recording is performed. If the judgment result is "yes," step S531 is performed. As such, the connection test for the wireless beacon 130 in the elevator car 110 is completed.

In step S531, a service request test for the wireless beacon 130 is performed. That is, the mobile terminal 200 automatically sends to the wireless beacon 130 a service request test command regarding each destination floor, so as to enable the wireless beacon 130 to automatically complete a registration request test for all destination floors to be tested.

Further, in step S532, it is judged whether the registration request test for a corresponding destination floor is successful. If the judgment result is "no," a corresponding record is made, that is, step S590 of recording is performed. If the judgment result is "yes," the elevator car 110 will run and stop according to the destination floor successfully registered, that is, step S540 is performed, in which the elevator car 110 stops on the next destination floor (for example, Floor 2) registered, and the car door is opened.

In step S551, a connection test for the wireless beacon 120 is performed. When the car door is opened, the mobile terminal 200 in the elevator car 110 can sense the wireless signal 123 broadcast by the wireless beacon 120 in the elevator landing zone 410-2 of the Floor 2, and first test whether the wireless beacon 120 of the floor can successfully establish a wireless connection 320 with the mobile terminal 200. If the judgment result is "no," a corresponding record is made, that is, step S590 of recording is performed. If the judgment result is "yes," a further test is conducted, and step S552 is performed.

In step S552, it is tested whether the wireless beacon 120 of the floor can successfully establish a communication connection with the elevator controller 140. If the judgment result is "no," a corresponding record is made, that is, step S590 of recording is performed. If the judgment result is "yes," step S561 is performed. As such, the connection test for the wireless beacon 120 mounted in the elevator landing zone 410 of the Floor is completed.

It will be appreciated that the communication verification step in step S510 can also be performed prior to step S551.

In step S561, a service request test command regarding an elevator call direction is sent to the wireless beacon 120 of the floor to enable the wireless beacon 120 to automatically complete an elevator call request test for all elevator call directions. In this step, a service request test command regarding "up" and "down" elevator call directions is sent automatically.

In step S562, it is judged whether the elevator call request test for the corresponding elevator call directions is successful. If the judgment result is "no," a corresponding record is made, that is, step S590 of recording is performed. If the judgment result is "yes," it indicates that the elevator call function of the wireless beacon 120 is normal, and then step S570 is performed to judge whether the elevator car has stopped on all the destination floors. If the judgment result is "no," step S540 is performed again, and the elevator car 110 continues to run upward and stop floor by floor. Step S551 to step S562 are repeated for the wireless beacon 120 of each floor, until the wireless beacons 120 of all the floors are tested.

It will be appreciated that in the testing method of the above embodiment, the mobile terminal 200 according to the embodiment of the present invention is put into a certain elevator car 110, then the test for the wireless beacon 130 and the wireless beacons 120 of all the floors can be completed automatically, and test results can be recorded automatically. The operation is very convenient, simple and efficient, thereby greatly reducing the test workload for the wireless beacons 120 or 130.

Figure 6:
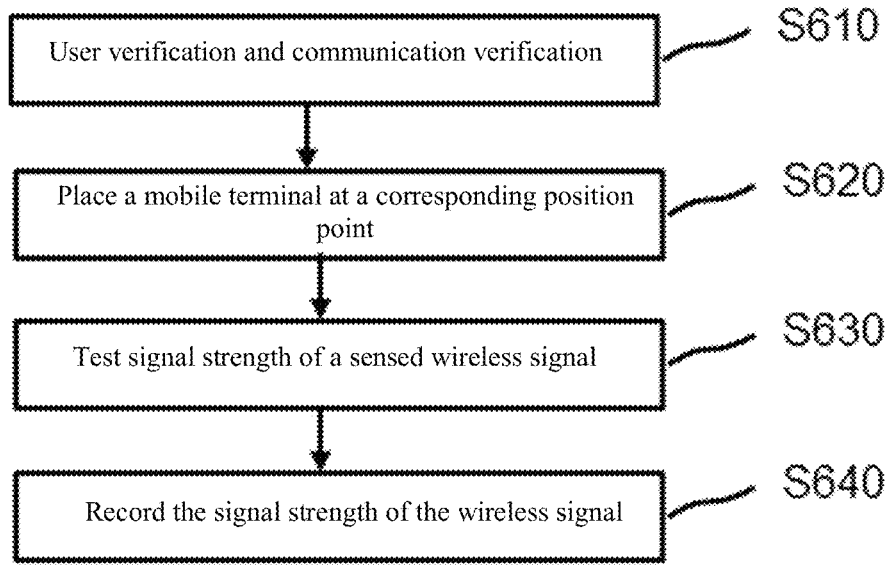
FIG. 6 is a flowchart of a wireless beacon testing method according to another embodiment of the present invention.

FIG. 6 is a flowchart of a wireless beacon testing method according to another embodiment of the present invention. The process of the testing method is illustrated in detail below with reference to FIG. 1, FIG. 3 and FIG. 6, and the working principle of the mobile terminal 200 is illustrated.

First of all, in step S610, user verification and communication verification that are the same as those in step S510 as shown in FIG. 5 are performed.

After the verifications in step S610 succeed, step S620 is performed, in which the mobile terminal 200 is placed at a corresponding position point. As shown in FIG. 3, the mobile terminal 200 is placed at a position point 310b in the elevator landing zone 410, or the mobile terminal 200 is placed at a certain position point 310b in the elevator car 110. It should be understood that the selection of the specific position point is not limited, and the position point can be set according to specific requirements.

Further, in step S630, signal strength of the sensed wireless signal 123 is tested. In combination with FIG. 3, the mobile terminal 200 located at the position point 310a not only can test signal strength of a wireless signal 123 broadcast by the wireless beacon 130 but also can test signal strength of a wireless signal 123 broadcast by the wireless beacon 120 if the wireless signal 123 broadcast by the wireless beacon 120 can also be sensed. The wireless signal testing module 340 of the mobile terminal 200 located at the position point 310b can test the signal strength of the wireless signal 123 broadcast by the wireless beacon 120.

It should be noted that an ideal value of the signal strength of the wireless signal 123 at the position point 310a or 310b can be obtained in advance, and the user 90 can compare the magnitude of the signal strength obtained by testing and the corresponding ideal value to judge whether the signal strength of the wireless signal 123 broadcast by the wireless beacon 120 or 130 needs to be adjusted.

In step S640, the above signal strength value obtained by testing will be recorded. The recorded signal strength value can be used for, for example, adjusting the signal strength of the wireless signal 123 broadcast by the wireless beacon 120 or 130.

It will be appreciated that the above step S620 to step S640 can be repeated to implement the signal strength testing process multiple times or implement the signal strength testing process for multiple position points. Moreover, the above step S620 to step S640 can be applied to the process of the testing method as shown in FIG. 3, for example, they are completed between step S532 and step S540 or completed between step S540 and step S551.

Figure 4:
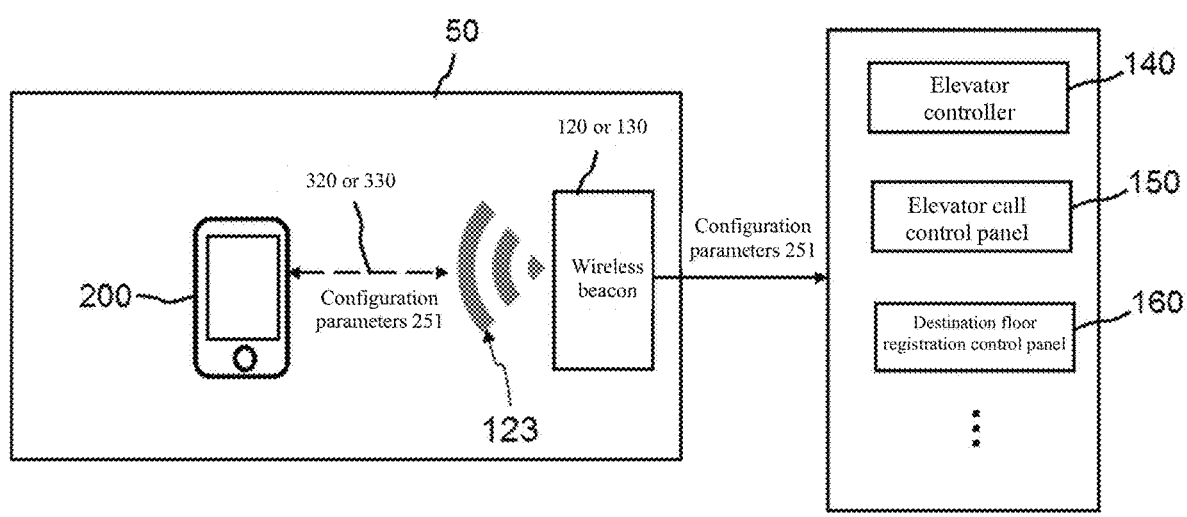
FIG. 4 is a schematic structural diagram of a field configuration apparatus according to an embodiment of the present invention.

FIG. 4 is a schematic structural diagram of a field configuration apparatus according to an embodiment of the present invention. As shown in FIG. 4, the field configuration apparatus 50 can configure a configurable component in the elevator system 10 by using the wireless beacon 120 or 130 in the elevator system 10 in the embodiment as shown in FIG. 8. The wireless beacon 120 or 130 is configured to establish a communication connection with the corresponding configurable component in the elevator system 10, for example, the wireless beacon 120 or 130 can establish a serial communication connection with the elevator controller 140, the elevator call control panel 150, the destination floor registration control panel 160 and the like. The field configuration apparatus 50 further includes the mobile terminal 200 in the embodiment as shown in FIG. 1. The mobile terminal 200 is configured to enable the field configuration apparatus 50 to establish a wireless connection with the selected wireless beacon 120 or 130, and further configured to input configuration parameters 251 to configure the wireless beacon 120 or 130 or a corresponding component in the elevator system 10 that is communicatively connected with the wireless beacon 120 or 130, for example, the elevator call control panel 150. Specifically, the mobile terminal 200 is provided with the field configuration module 250 as shown in FIG. 1 and can be further provided with the user verification module 210 as shown in FIG. 1. As such, during field configuration of a component of the elevator system 10, security authorization is performed corresponding to the configuration operation.

In the field configuration apparatus 50, according to the characteristic that the wireless beacon 120 can establish a communication connection with the configurable components of the elevator system 10 and can conveniently establish, for example, a Bluetooth connection with the mobile terminal 200, the mobile terminal 200 can input configuration parameters 251 to conveniently configure the corresponding components. The configuration operation of the corresponding components can be completed in the place where the wireless beacon 120 is provided. In addition, the operation is relatively simple, so that a relatively complex configuration operation can be implemented.

In an example, by taking display color configuration of a display panel of the elevator call control panel 150 as an example, the user 90 carrying the mobile terminal 200 moves to the position of the wireless beacon 120 corresponding to the elevator call control panel 150. The wireless beacon 120 establishes a communication connection with the elevator call control panel 150. The mobile terminal 200 can sense a wireless signal 123 broadcast by the wireless beacon 120 and establish a wireless connection 320. The user 90 inputs a configuration parameter 251, such as a configuration parameter 251 that represents blue, through a corresponding interface of an APP on the mobile terminal 200. The configuration parameter 251 can be sent to the wireless beacon 120 through the wireless connection and then input to the elevator call control panel 150. The elevator call control panel 150 sets the display color of the display panel to, for example, blue according to the configuration parameter 251.

In an embodiment, the field configuration apparatus 50 can be further configured to adjust signal strength of the wireless signal 123 broadcast by the wireless beacon 120. The field configuration module 150 in the mobile terminal 200 of the field configuration apparatus 50 can input a configuration parameter 251 about signal strength based on a signal strength value of a wireless signal 120 broadcast by the wireless beacon 120 tested by the wireless signal testing module 240 at, for example, the position point 310b (as shown in FIG. 3). The configuration parameter 251 is sent to the wireless beacon 120 through the wireless connection 320, so as to adjust signal strength of the wireless beacon 120. As such, the signal strength tested at, for example, the position point 310b is basically equal to an elevator call trigger threshold. Thus, the passenger 90 can accurately and automatically trigger an elevator call when carrying the personal mobile terminal 300, thereby improving the experience of the passenger 90.

In an embodiment, the field configuration apparatus 50 is further configured to acquire current state information of the wireless beacon (120 or 130) or the corresponding component in the elevator system 10 that is communicatively connected with the wireless beacon. As such, the state information can be easily obtained. The user 90 can easily keep track of the state information of the wireless beacons and various components, and the maintenance workload of the user 90 can be greatly reduced especially in the maintenance process.

Figure 7:
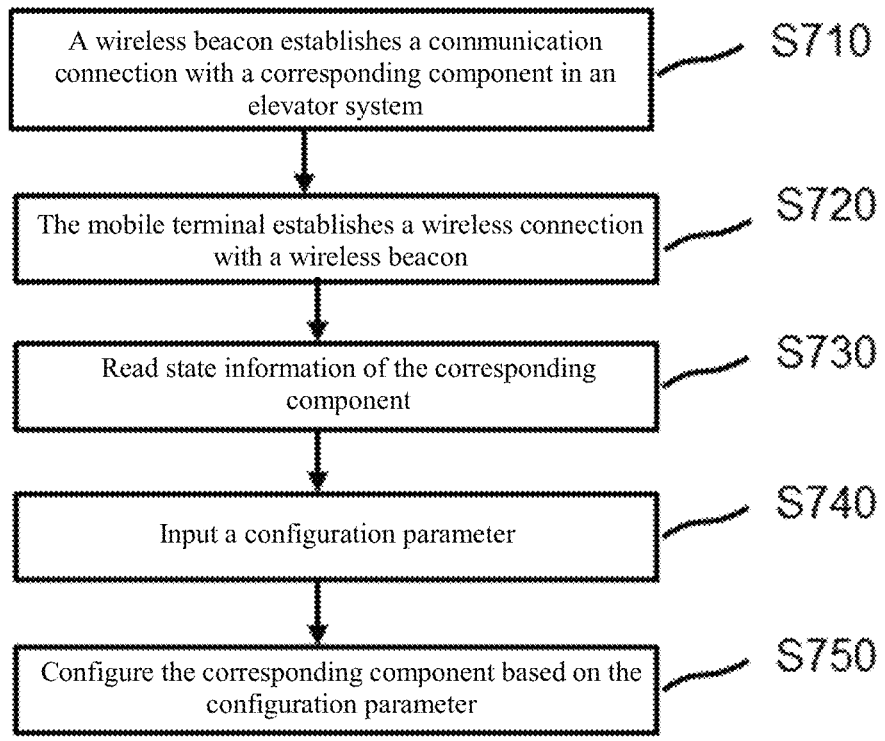
FIG. 7 is a flowchart of a field configuration method for a component of an elevator system according to another embodiment of the present invention.

FIG. 7 is a flowchart of a field configuration method for a component of an elevator system according to another embodiment of the present invention. The process of the field configuration method is illustrated in detail below with reference to FIG. 7 and FIG. 4, and the working principle of the field configuration apparatus 50 is illustrated.

In an installation or maintenance process of the elevator system 10, it is assumed that adjustment and configuration need to be performed for one or more components. First of all, in step S710, the wireless beacon 120 or 130 establishes a communication connection with the corresponding component in the elevator system 10 (for example, the elevator call control panel 150). The step can be omitted if the wireless beacon 120 or 130 has established a communication connection with the corresponding component in the elevator system 10.

In step S720, when the mobile terminal 200 gets close to the wireless beacon 120 or 130 on site, the mobile terminal 200 will automatically establish a wireless connection with the wireless beacon 120 or 130. The wireless connection needs to be maintained for a long time in the subsequent configuration process.

In step S730, state information of the corresponding component is read. The content or type of the state information is different for different components. As such, the mobile terminal 200 can conveniently obtain the state information. The user 90 can easily keep track of the state information of the wireless beacon and various components, and especially in the maintenance process, the maintenance workload of the user 90 can be greatly reduced.

In step S740, a configuration parameter 251 is input. For example, the user 90 inputs corresponding configuration parameter 251 through a corresponding interface of an APP on the mobile terminal 200. The configuration parameter 251 can be sent to the wireless beacon 120 through the wireless connection and then transmitted to the corresponding configured component.

In step S750, the corresponding component is configured based on the configuration parameter 251. For example, as in the above example, the elevator call control panel 150 sets the display color of the display panel to blue according to the configuration parameter 251.

It will be appreciated that by repeating step S740 and step S750, configuration for many aspects of the same component can be implemented. By repeating step S710 to step S750, configuration operations for different components of the elevator system 10 can be implemented.

It will be appreciated that the field configuration method in the embodiment as shown in FIG. 7 can be performed together with the testing method in the embodiment as shown in FIG. 5. For example, the testing method in the embodiment as shown in FIG. 5 is performed first and then the field configuration method in the embodiment as shown in FIG. 7 is performed.

It should be noted that although the elevator system 10 in the embodiment shown in FIG. 8 is illustrated, those skilled in the art will understand that the mobile terminal 200, the field configuration apparatus 50, the testing method or the field configuration method in the above embodiments is not limited to the application in the elevator system 10 in the above examples for mounting, debugging or maintenance, and can also be applied to elevator systems in other examples. For example, they can be applied to an elevator system in which wireless beacons are only mounted in elevator landing zones (no wireless beacon is mounted in the elevator car) to realize an automatic elevator call.

It should be noted that the mobile terminal 200 in the above embodiment of the present invention can be implemented by using computer program instructions, e.g., implemented by a specific APP. These computer program instructions may be provided to a processor of a general-purpose computer, a special-purpose computer, or another programmable data processing device to form the mobile terminal 200 in the embodiment of the present invention. Moreover, the processor of the computer or another programmable data processing device may execute these instructions to create units or components for implementing functions/operations designated in these flowcharts and/or blocks and/or one or more flowchart blocks.

Similarly, the wireless beacon 120 or 130 of the elevator system 10 in the above embodiment of the present invention can be implemented by using computer program instructions, for example, implemented through a special program, and these computer program instructions can be provided to a processor to constitute the control module in the embodiment of the present invention. Moreover, units or components for implementing functions/operations designated in the flowcharts and/or blocks and/or one or more flowchart blocks can be created according to the instructions executed by a processor of a computer or another programmable data processing device.

Besides, these computer program instructions may be stored in a computer readable memory. These instructions can instruct the computer or another programmable processor to implement functions in specific manners, such that these instructions stored in the computer readable memory construct a product including instruction components for implementing functions/operations designated in one or more blocks of the flowcharts and/or block diagrams.

It should be further noted that in some alternative implementations, the functions/operations shown in the blocks may not take place according to the sequence shown in the flowchart. For example, two blocks shown sequentially may be performed substantially at the same time, or these blocks sometimes may be executed in a reversed order, which specifically depends on the functions/operations involved.

It should be noted that elements (including the flowcharts and block diagrams in the accompanying drawings) disclosed and depicted in this text refer to logic boundaries between elements. However, according to software or hardware engineering practices, the depicted elements and functions thereof can be executed on a machine by using a computer executable medium. The computer executable medium has a processor that can execute a program instruction stored thereon. The program instruction serves as a single-chip software structure, an independent software module, or a module using an external program, code, service or the like, or any combination thereof. Moreover, all these execution solutions may fall within the scope of the disclosure.

Although different non-limitative implementation solutions have components that are specifically illustrated, the implementation solutions of the present invention are not limited to these specific combinations. Some of the components or features from any non-limitative implementation solution may be combined with features or components from any other non-limitative implementation solution.

Although specific step sequences are shown, disclosed and required, it should be understood that the steps may be implemented in any sequence, separated, or combined, and they will still benefit from the disclosure unless otherwise specified.

The foregoing descriptions are exemplary and are not defined to be limitative. Various non-limitative implementation solutions are disclosed in this text. According to the foregoing teachings, those of ordinary skill in the art will realize that various modifications and variations will fall within the scope of the appended claims. Therefore, it should be understood that disclosure content other than those specifically disclosed can be implemented within the scope of the appended claims. Therefore, the appended claims should be read up to determine the real scope and content.

What is claimed is:

1. A mobile terminal for testing a wireless beacon that is mounted in an elevator system and used for establishing a wireless connection with the mobile terminal and receiving service request commands, the wireless beacon being at least coupled to an elevator controller of the elevator system, wherein
the mobile terminal is configured to comprise:
a connection testing module configured to test whether the wireless beacon can successfully establish the wireless connection with the mobile terminal and/or configured to test whether the wireless beacon can successfully establish a communication connection with the elevator controller; and
a service request testing module configured to send a service request test command to the wireless beacon to enable the wireless beacon to automatically complete a service request test on the wireless beacon.

2. The mobile terminal according to claim 1, wherein the wireless beacon comprises:
a first wireless beacon mounted in an elevator car of the elevator system, configured to broadcast a first wireless signal and receive a service request test command regarding a destination floor; and
a second wireless beacon mounted in an elevator landing zone of the elevator system, configured to broadcast a second wireless signal and receive a service request test command regarding an elevator call direction.

3. The mobile terminal according to claim 2, wherein the connection testing module is further configured to test whether the first wireless beacon can successfully establish a first wireless connection with the mobile terminal and test whether the first wireless beacon can successfully establish a first communication connection with the elevator controller.

4. The mobile terminal according to claim 3, wherein the service request testing module is further configured to send to the first wireless beacon a service request test command regarding a destination floor to enable the first wireless beacon to automatically complete a registration request test for all destination floors to be tested.

5. The mobile terminal according to claim 2, wherein the connection testing module is further configured to test whether the second wireless beacon can successfully establish a second wireless connection with the mobile terminal and test whether the second wireless beacon can successfully establish a second communication connection with the elevator controller.

6. The mobile terminal according to claim 5, wherein the service request testing module is further configured to send to the second wireless beacon a service request test command regarding an elevator call direction to enable the second wireless beacon to automatically complete an elevator call request test for all elevator call directions.

7. The mobile terminal according to claim 4, wherein the second wireless beacon comprises a plurality of second wireless beacons and the destination floors to be tested comprise floors where the second wireless beacons to be tested are located.

8. The mobile terminal according to claim 6, wherein the connection testing module is further configured to, when the elevator car stops on a corresponding destination floor and the car door opens, automatically test whether the second wireless beacon of the destination floor can successfully establish a second wireless connection with the mobile terminal and test whether the second wireless beacon of the destination floor can successfully establish a second communication connection with the elevator controller; and the service request testing module is further configured to send to the second wireless beacon of the destination floor a service request test command regarding all the elevator call directions to enable the second wireless beacon of the destination floor to automatically complete the elevator call request test for all the elevator call directions.

9. The mobile terminal according to claim 1, further comprising:

a recording module configured to at least record a service request test result returned from the wireless beacon.

10. The mobile terminal according to claim 6, further comprising:

a recording module configured to at least record a registration request test result returned from the first wireless beacon and comprising a registration failure of a corresponding destination floor, and/or further configured to at least record an elevator call request test result returned from the second wireless beacon and comprising an elevator call request failure regarding a particular elevator call direction on a corresponding floor.

11. The mobile terminal according to claim 1, further comprising a wireless signal testing module configured to test signal strength of the wireless signal sensed at a corresponding position point relative to the wireless beacon.

12. The mobile terminal according to claim 11, wherein the mobile terminal further comprises a recording module configured to record the signal strength tested by the wireless signal testing module.

13. The mobile terminal according to claim 1, further comprising:

a field configuration module configured to enable the mobile terminal to establish a wireless connection with the wireless beacon and input configuration parameters to configure the wireless beacon or a corresponding component in the elevator system that is communicatively connected with the wireless beacon.

14. The mobile terminal according to claim 13, wherein the component comprises an elevator call control panel, a destination floor registration control panel and the elevator controller.

15. The mobile terminal according to claim 13, wherein the field configuration module is further configured to adjust signal strength of a wireless signal broadcast by the wireless beacon.

16. The mobile terminal according to claim 13, wherein the field configuration module is further configured to acquire current state information of the wireless beacon or the corresponding component in the elevator system that is communicatively connected with the wireless beacon.

17. The mobile terminal according to claim 1, further comprising:

a user verification module configured to verify the identity of a user who tests the wireless beacon by using the mobile terminal.

18. The mobile terminal according to claim 1, wherein the wireless beacon is a Bluetooth module or Bluetooth Low Energy module, and the wireless signal is a Bluetooth signal or Bluetooth Low Energy signal.

19. A method of testing a wireless beacon mounted in an elevator system, wherein the wireless beacon is used for establishing a wireless connection with a mobile terminal and receiving service request commands, and the wireless beacon is at least coupled to an elevator controller of the elevator system; the method comprises the following steps:

a connection testing step of testing whether the wireless beacon can successfully establish the wireless connection with the mobile terminal and/or testing whether the wireless beacon can successfully establish a communication connection with the elevator controller; and a service request testing step of, when it is tested that the wireless connection and the communication connection have been successfully established, sending a service request test command to the wireless beacon to enable the wireless beacon to automatically complete a service request test on the wireless beacon.

20. A mobile terminal, comprising a memory, a processor and a computer program that is stored in the memory and can run on the processor, wherein the steps of the method according to claim 19 are implemented when the processor executes the program.

21. A non-transitory computer readable storage medium with a computer program stored thereon, wherein the program is executed by a processor to implement the steps of the method according to claim 19.

* * * * *